(12) United States Patent
Hayashi et al.

(10) Patent No.: US 6,771,522 B2
(45) Date of Patent: Aug. 3, 2004

(54) INVERTER PARALLEL OPERATION SYSTEM

(75) Inventors: Hidetake Hayashi, Nagoya (JP); Hitoshi Takimoto, Seto (JP); Touru Yoshioka, Nitta-gun (JP)

(73) Assignees: Kabushiki Kaisha Toshiba, Tokyo (JP); Sawafuji Electric Co., Ltd., Tokyo (JP)

(*) Notice: Subject to any disclaimer, the term of this patent is extended or adjusted under 35 U.S.C. 154(b) by 0 days.

(21) Appl. No.: 10/457,722

(22) Filed: Jun. 10, 2003

(65) Prior Publication Data

US 2003/0198065 A1 Oct. 23, 2003

Related U.S. Application Data

(63) Continuation of application No. 09/938,856, filed on Aug. 27, 2001, now abandoned.

(30) Foreign Application Priority Data

Aug. 31, 2000 (JP) ........................................ 2000-262832
Jan. 9, 2001 (JP) ............................................ 2001-1497

(51) Int. Cl.[7] ................................................ G09F 1/70
(52) U.S. Cl. ............................ 363/71; 323/207; 700/67
(58) Field of Search ............................. 323/207; 363/35, 363/37, 41, 131, 71; 700/67

(56) References Cited

U.S. PATENT DOCUMENTS

| | | | |
|---|---|---|---|
| 3,922,594 A | 11/1975 | Brown | |
| 4,251,736 A | * 2/1981 | Coleman | 307/46 |
| 4,639,848 A | 1/1987 | Sakai | |
| 4,879,639 A | 11/1989 | Tsukahara | |
| 5,053,939 A | * 10/1991 | Kirchberg, Jr. et al. | 363/41 |
| 5,083,039 A | * 1/1992 | Richardson et al. | 290/44 |
| 5,187,427 A | * 2/1993 | Erdman | 323/207 |
| 5,438,253 A | * 8/1995 | Aritsuka et al. | 323/207 |
| 6,459,601 B1 | * 10/2002 | Oba | 363/131 |

FOREIGN PATENT DOCUMENTS

| | | |
|---|---|---|
| JP | 05211777 | 8/1993 |
| JP | 05236658 | 9/1993 |

* cited by examiner

*Primary Examiner*—Shawn Riley
(74) *Attorney, Agent, or Firm*—Pillsbury Winthrop LLP

(57) ABSTRACT

An inverter includes a DC power supply circuit, an inverter circuit having a plurality of switching elements and switching an output of the DC power supply circuit on the basis of a PWM signal to deliver a high-frequency voltage, a filter circuit converting the high-frequency voltage to a substantially sinusoidal AC voltage, a power detector detecting an effective or wattless power of the AC power, a phase angle calculator calculating a phase angle of current relative to voltage from the detected effective or wattless power, a phase detector detecting a leading or lagging state of the phase angle, and a controller decreasing a frequency of the output voltage when the phase detector detects the leading state of the phase angle, the controller increasing the frequency of the output voltage when the phase detector detects the lagging state of the phase angle.

18 Claims, 21 Drawing Sheets

PEAK LIMITER CIRCUIT IS ON

FIG.16A
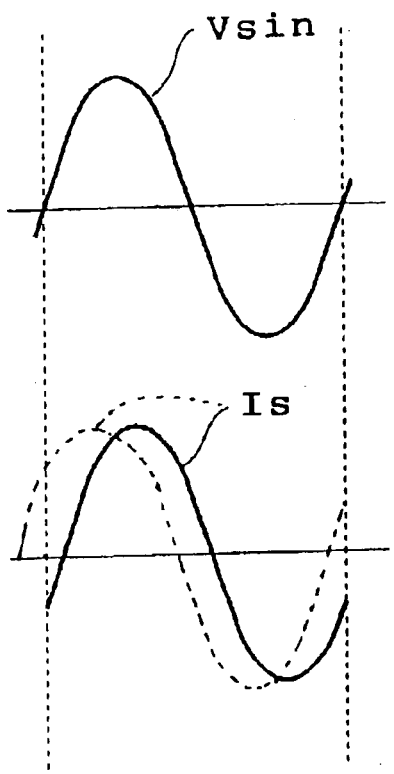
FIG.16B
FIG.16C
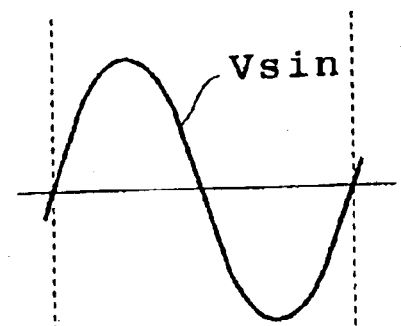
FIG.16D
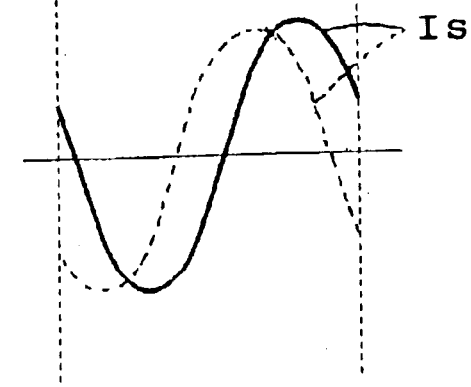

INVERTER PARALLEL OPERATION SYSTEM

This is a Continuing Application of U.S. application Ser. No. 09/938,856 filed Aug. 27, 2001 now abandoned, which is based upon and claims the benefit of priority from the prior Japanese Patent Application No. 2000-262832, filed Aug. 31, 2000, and Japanese Patent Application No. 2001-1497, filed Jan. 9, 2001, the entire contents of each of which are incorporated herein by reference.

BACKGROUND OF THE INVENTION

1. Field of the Invention

This invention relates to an inverter suitable for use with portable AC power supply units.

2. Description of the Related Art

Inverters have been incorporated in portable AC power supply units, drivers of AC motors, uninterruptable power supply units, etc. As one of modes of application, a plurality of, for example, two portable AC power supply units are connected in parallel with each other to drive a load. In this case, the portable AC power supply units are operated with output frequencies in synchronism with each other. Current (cross current) flows from one of the power supply units to the other when a change in the load etc. results in a subtle change in the frequency of either power supply unit. The cross current sometimes breaks circuit components of the portable AC power supply unit. The cross current flows from the power supply unit with a higher output frequency to the one with a lower output frequency.

As one of measures preventing the cross current flowing between the portable AC power supply units, a lag or lead in a phase between output voltage and output current is monitored. An output frequency is adjusted on the basis of the phase lag or lead, whereby the cross current is prevented. FIG. 22 shows one of the conventional arrangements for preventing the cross current. A portable AC power supply unit 1 comprises an engine drive AC generator 2 and an inverter unit 3 having output terminals 3a and 3b from which a sinusoidal AC voltage is delivered. The inverter unit 3 includes a rectifier circuit 4 rectifying a three-phase AC voltage generated by the AC generator 2, a smoothing capacitor 5, a single-phase full-bridge inverter circuit 6, a filter circuit 7, a control circuit 8 and a drive circuit 9. The control circuit 8 includes a microcomputer 10 and a pulse-width-modulation (PWM) circuit 11 generating a drive signal. The inverter circuit 6 is adapted to be connected to a load. When a plurality of the portable AC power supply units 1 are to be connected to each other, the inverter circuits 6 of the respective power supply units 1 are connected to each other.

In the above-described arrangement, the control circuit 8 controls the generator 2 so that the engine maintains a predetermined number of revolution. The control circuit 8 further performs a PWM control so that a sine wave AC voltage having a predetermined voltage (for example, an effective value of 100V) at a predetermined frequency (50 Hz or 60 Hz) is delivered from the output terminals 3a and 3b. The control circuit 8 further includes an output voltage detecting circuit 12 detecting an output voltage of the inverter circuit 6, an output current detecting circuit 13 detecting an output current of the inverter circuit 6 and a phase difference detecting circuit 14 detecting a phase difference between the output voltage and the output current. The control circuit 8 increases an output frequency when the output current lags behind the output voltage. Further, the control circuit 8 decreases the output frequency when the output current leads the output voltage. Consequently, an output balance is achieved between the two AC power supply units 1 connected in parallel with each other. The output frequencies are adjusted in a range between 49.90 Hz and 50.10 Hz when the portable AC power supply units are of 50 Hz specification.

In the above-mentioned detection of the phase difference, the phase difference is detected by measuring a time from a zero cross point of the output voltage (AC) to a zero cross point of the output current. However, when a detected waveform of the output current is distorted, the zero crossing may occur twice or the timing of the zero crossing may not be normal. As a result, the output currents are not balanced between the power supply units in a parallel operation of the power supply units.

SUMMARY OF THE INVENTION

Therefore, an object of the present invention is to provide an inverter in which the output currents are balanced in the parallel operation of the power supply units.

The present invention provides an inverter comprising a DC power supply circuit, an inverter circuit having a plurality of switching elements and switching an output of the DC power supply circuit on the basis of a PWM signal to deliver a high-frequency voltage, a filter circuit converting the high-frequency voltage to a substantially sinusoidal AC voltage, a power detector detecting an effective or wattless power of the AC power, a phase angle calculator calculating a phase angle of current relative to voltage from the detected effective or wattless power, a phase. detector detecting a leading or lagging state of the phase angle, and a controller decreasing a frequency of the output voltage when the phase detector detects the leading state of the phase angle, the controller increasing the frequency of the output voltage when the phase detector detects the lagging state of the phase angle.

According to the above-described arrangement, the effective power or wattless power contains a phase angle element between the output voltage and the output current. The effective or wattless power is detected, and the phase angle calculator calculates a phase angle on the basis of the detected effective or wattless power. Consequently, an accurate phase angle can be detected even when the output current or the output current detector contains a waveform distortion and accordingly, the accuracy in the detection of the phase angle can be improved. Furthermore, the phase detector detects the leading or lagging state of the calculated phase angle, and the controller decreases the frequency of the output voltage when the phase detector detects the leading state of the phase angle. The phase detector increases the frequency of the output voltage when the phase detector detects the lagging state of the phase angle. Consequently, an accurate frequency control can be carried out, and the output currents are balanced in the parallel operation of the power supply units.

BRIEF DESCRIPTION OF THE DRAWINGS

Other objects, features and advantages of the present invention will become clear upon reviewing the following description of a preferred embodiment, made with reference to the accompanying drawings, in which:

FIGS. 16A to 16D are waveform charts showing a fourth embodiment in accordance with the invention;

DETAILED DESCRIPTION OF PREFERRED EMBODIMENTS

Figure 1:
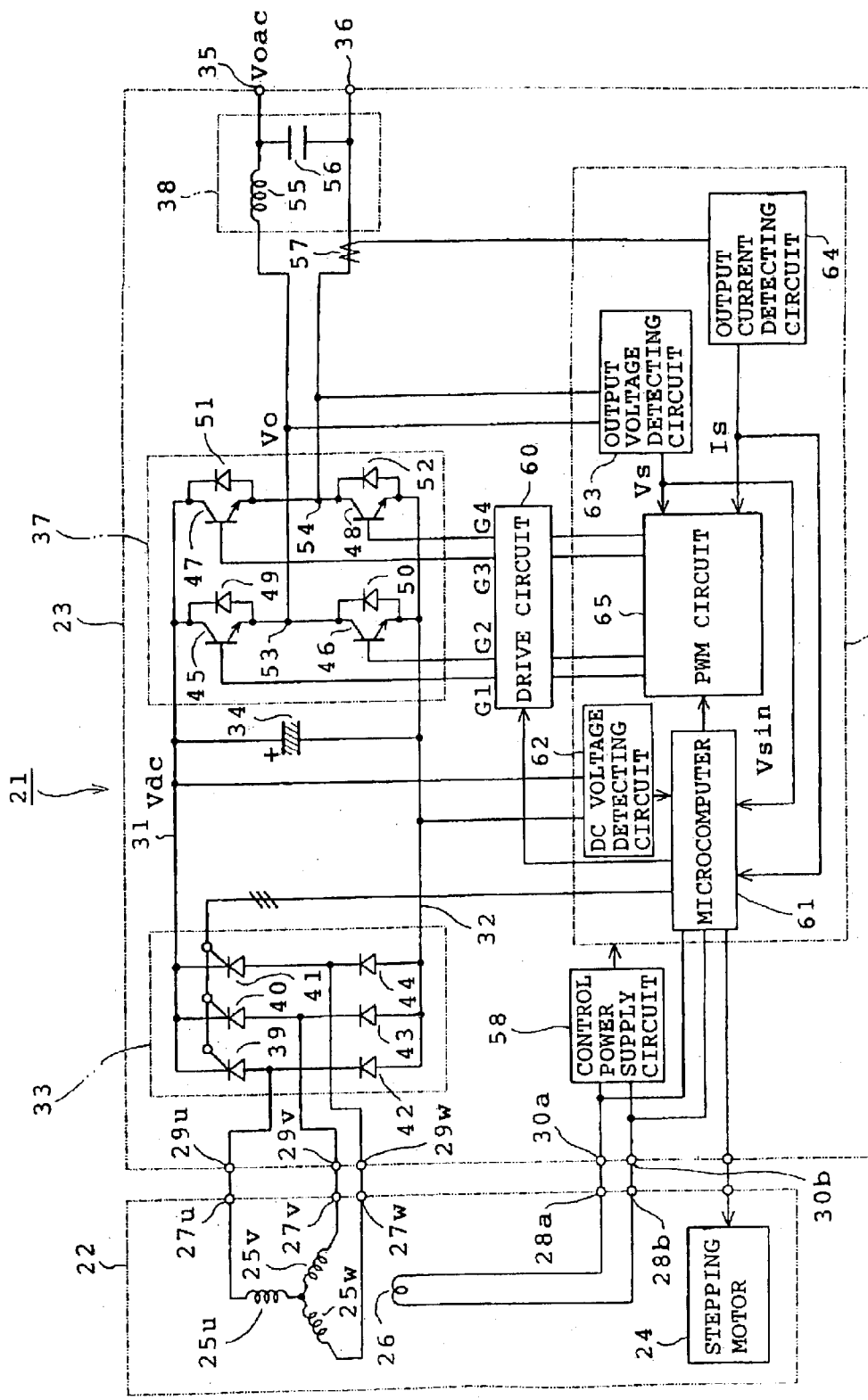
FIG. 1 is a circuit diagram showing an electrical arrangement of a portable AC power supply unit to which an inverter of an embodiment in accordance with the present invention is applied.

An embodiment in accordance with the present invention will be described with reference to FIGS. 1 to 12. The inverter of the invention is incorporated in a portable AC power supply unit in the embodiment. Referring to FIG. 1, an electrical arrangement of the portable AC power supply unit 21 generating AC power of 100 V and 50 Hz or 60 Hz, for example. The portable AC power supply unit 21 comprises a three-phase AC generator 22 driven by an engine (not shown) and a single-phase inverter unit 23 connected to a rear stage of the generator. The generator 22 includes a rotor, an armature neither of which is shown, and a stepping motor 24 controlling a flow rate of fuel (gasoline) to the engine so that a rotational speed of the engine is controlled. The armature has Y-connected primary windings 25u, 25v and 25w wound thereon and an auxiliary winding 26 wound thereon. Primary winding terminals 27u, 27v and 27w and auxiliary winding terminals 28a and 28b are connected to input terminals 29u, 29v and 29w, 30a and 30b of the inverter unit 23 respectively.

The inverter unit 23 will be described in detail. A rectifier circuit 33 is connected between DC power supply lines 31 and 32. The rectifier circuit 33 is further connected to the input terminals 29u, 29v and 29w. A smoothing capacitor 34 and an inverter circuit 37 are also connected between the DC power supply lines 31 and 32. The inverter circuit 37 is further connected to output terminals 35 and 36 of the inverter unit 23. A filter circuit 38 is connected to the inverter circuit 37. The rectifier circuit 33 serves as a DC power supply circuit in the invention. The rectifier circuit 33 comprises thyristors 39 to 41 and diodes 42 to 44 connected into a three-phase hybrid bridge configuration. The inverter circuit 37 comprises transistors (switching elements) 45 to 48 and diodes 49 to 52 connected into a full bridge configuration.

The filter circuit 38 comprises a reactor 55 and a capacitor 56. The reactor 55 is interposed between the output terminal 53 of the inverter circuit 37 and the output terminal 35 of the inverter unit 23. The capacitor 56 is connected between the output terminals 35 and 36 of the inverter unit 23. The inverter circuit 37 has an output terminal 54 directly connected to the output terminal 36 of the inverter unit 23. A current transformer 57 is connected across a current path between the output terminal 54 and the filter circuit 38 for detecting an output current. In a parallel operation of a plurality of the AC power supply units 21, the output terminals 35 and 36 of the inverter units 23 are connected in parallel with each other or one another, respectively.

Figure 2:
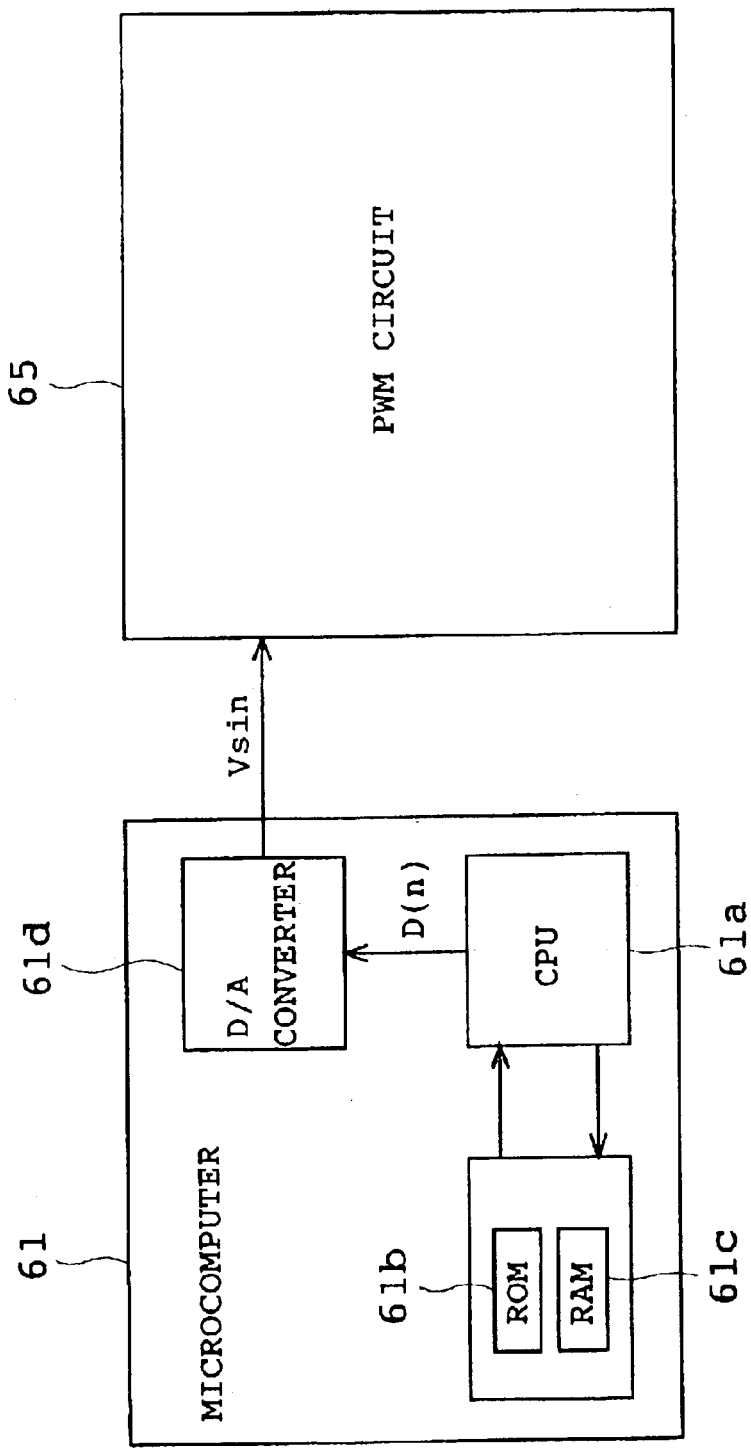
FIG. 2 is a schematic block diagram showing functions of a microcomputer employed in the power supply unit.

The inverter unit 23 further comprises a control power supply circuit 58, a control circuit 59 and a drive circuit 60. AC voltage induced in the auxiliary winding 26 is supplied to input terminals 30a and 30b of the control power supply circuit 58. The supplied AC voltage is rectified and smoothed into a control DC voltage (5 V or ±15 V, for example) for energizing the control circuit 59. The AC voltage induced in the auxiliary winding 26 is also supplied to the control circuit 59 for detection of the rotational speed of the engine. The control circuit 59 comprises a microcomputer 61, a DC voltage detecting circuit 62, an output voltage detecting circuit 63, an output current detecting circuit 64 and a pulse width modulation (PWM) circuit 65. The microcomputer 61 comprises a CPU 61a, a ROM 61b and a RAM 61c the latter two of which serve as storage means, and a D/A converter 61d serving as sine wave reference signal generator, as shown in FIG. 2. The microcomputer 61 further includes an input/output port, an A/D converter, a timer circuit, an oscillator circuit none of which are shown. These components are incorporated into a one-chip IC.

Figure 3:
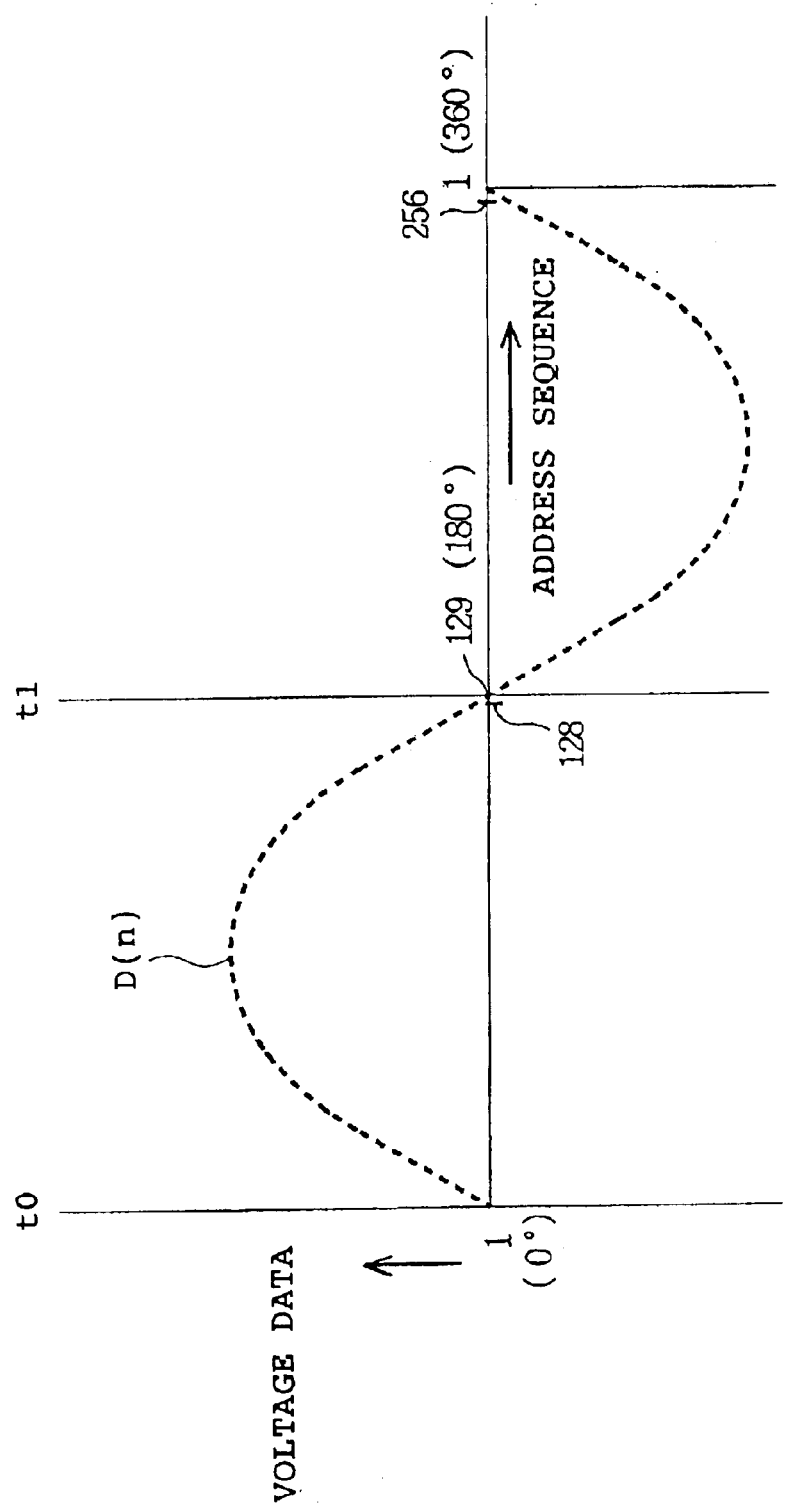
FIG. 3 is a graph showing a data table of sine wave reference data.
Figure 4:
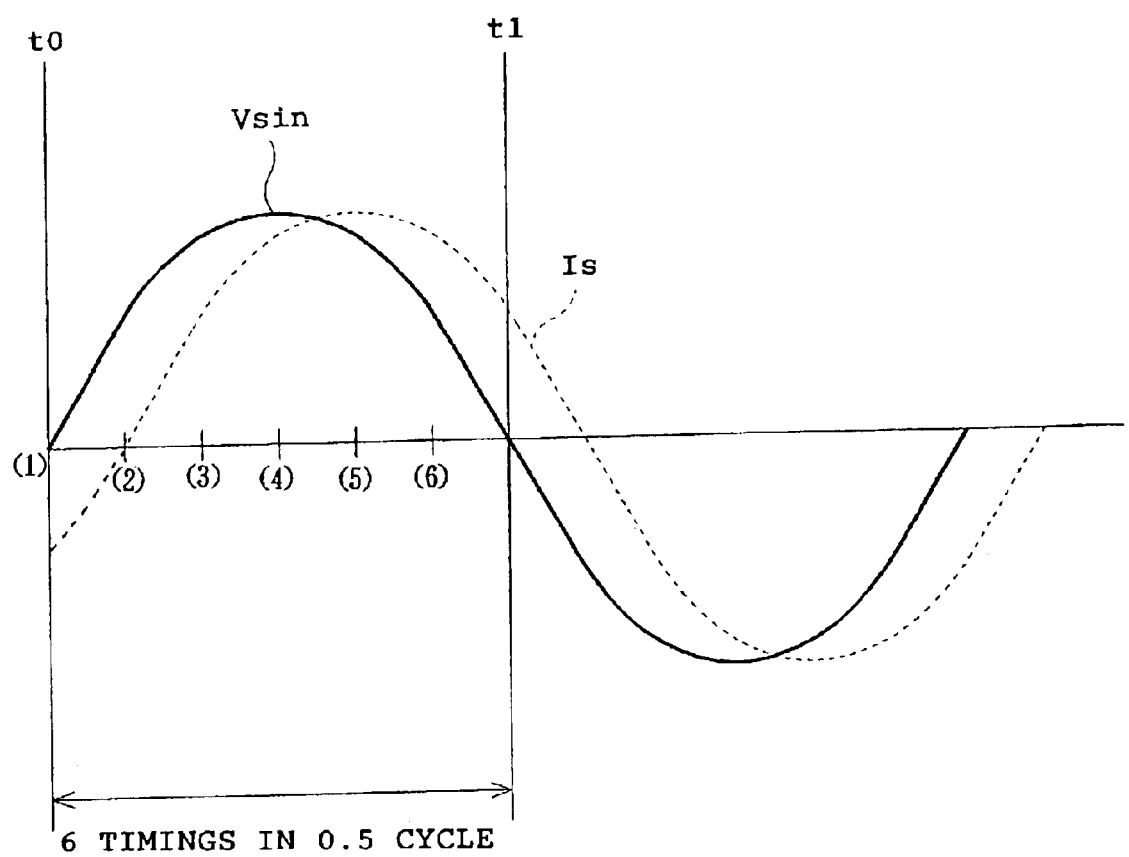
FIG. 4 is a graph showing a sine wave reference signal and an output current detection signal.

The ROM 61b stores as initial data sine wave reference data D(n) for one cycle where n changes from 1 to 256. FIG. 3 shows a data table of the sine wave reference data. More specifically, an axis of abscissas denotes a memory address sequence, whereas an axis of ordinates denotes sine wave reference data D(n). The sine wave reference data D(n) is sequentially increased or decreased between 1 and 256. The RAM 61c stores new sine wave reference data D(n). The sine wave reference data D(n) stored on the ROM 61b includes 256 data for one cycle as shown in FIG. 3. The 256 data correspond to values of amplitude of a sine wave reference signal Vsin (as shown in FIG. 4). When the power supply frequency is at 50 Hz, the 256 data are sequentially read out by the CPU 61a at an equal time interval for 1/50 sec. When the power supply frequency is at 60 Hz, the 256 data are sequentially read out by the CPU 61a at an equal time interval for 1/60 sec.

The DC voltage detecting circuit 62 detects DC voltage Vdc between the DC power supply lines 31 and 32 to deliver the detected DC voltage as a DC voltage signal to the microcomputer 61. The microcomputer 61 inputs the DC voltage signal. The microcomputer 61 turns off the thyristors 39 to 41 when the input DC voltage Vdc is above 180 V. The microcomputer 61 turns on the thyristors 39 to 41 when the input DC voltage Vdc is at or below 180 V. The output voltage detecting circuit 63 serving as output current detector includes a voltage divider circuit dividing voltage between the terminals 53 and 54 of the inverter circuit 37 and a filter eliminating carrier wave components from divided rectangular wave voltage, neither of which is shown. The output voltage detecting circuit 63 delivers an output voltage signal Vs to the microcomputer 61 and the PWM circuit 65. The output current detecting circuit 64 converts the output current detected by the current transformer 57 to a predetermined voltage level. The output current detecting circuit 64 delivers an output current signal Is as an output current signal to the microcomputer 61 and the PWM circuit 65. The PWM circuit 65 executes a PWM control to generate drive signals G1 to G4 for the transistors 45 to 48 respectively. The drive signals G1 to G4 are applied via the drive circuits 60 to the bases of the transistors 45 to 48 respectively.

Figure 5:
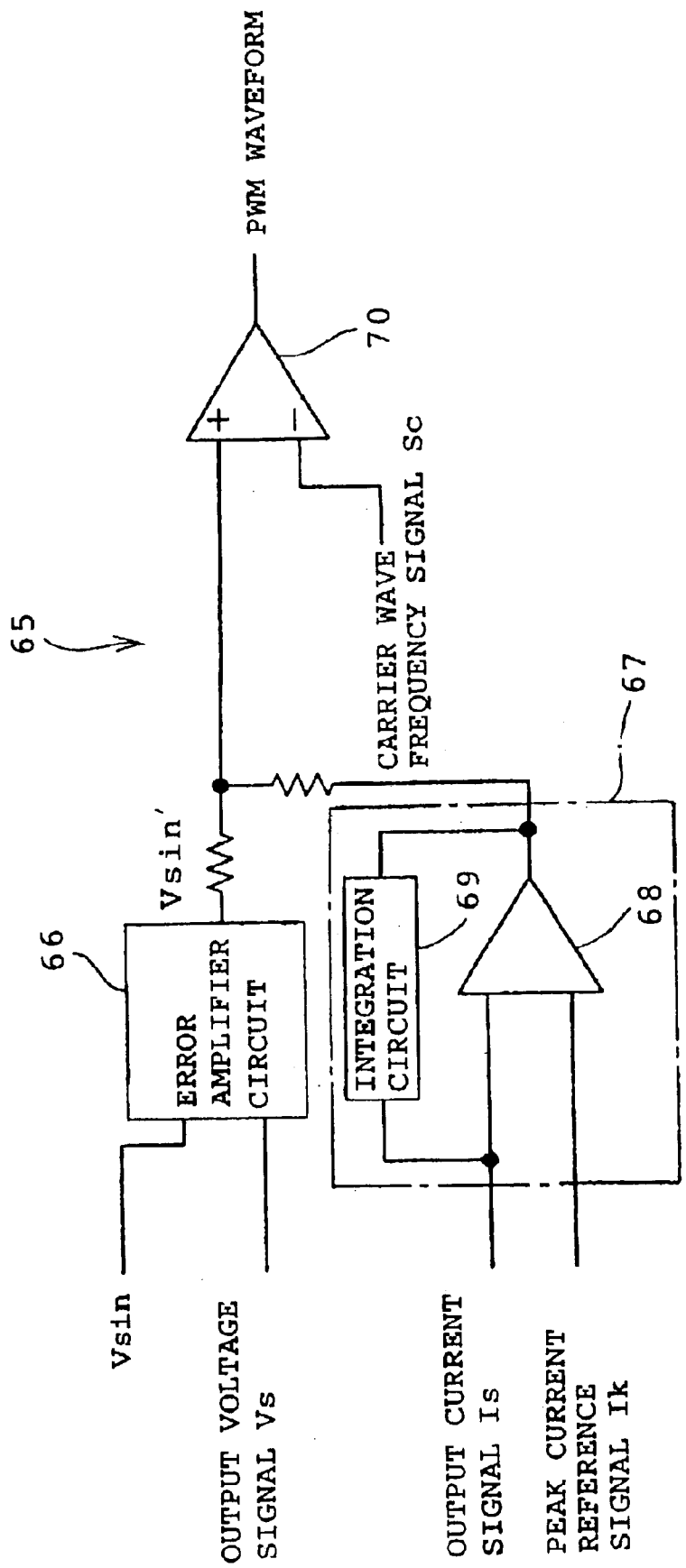
FIG. 5 is a circuit diagram showing a part of a PWM circuit.

An output frequency of the microcomputer 61 is set at either 50 Hz or 60 Hz by an input from an switch input section (not shown). For example, when an AC power supply of 50 Hz (100 V) is to be produced, the PWM circuit 65 is supplied with the sine wave reference signal Vsin as an AC reference voltage having a frequency equal to the set output frequency. The sine wave reference signal Vsin is supplied to an error amplifier circuit 66 of the PWM circuit 65 as shown in FIG. 5. The error amplifier circuit 66 is also supplied with an output voltage signal Vs delivered by the output voltage detecting circuit 63. The error amplifier circuit 63 executes amplification by subtraction to deliver a PWM control signal Vsin', whereupon the output voltage signal Vs is adjusted so that voltage and frequency of the signal Vs correspond to set values respectively, namely, a feedback control is carried out for the output voltage. The sine wave reference signal Vsin is also used for calculation of an effective power as will be described later.

Figure 6A:
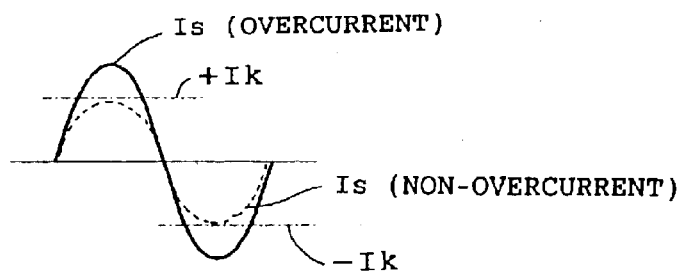
FIGS. 6A to 6C show waveforms at points in the circuit of FIG. 5 respectively.
Figure 6B:
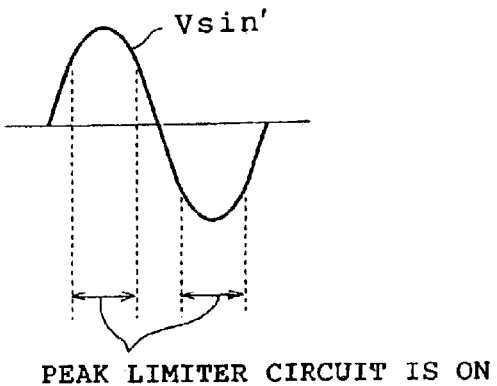
Figure 6C:
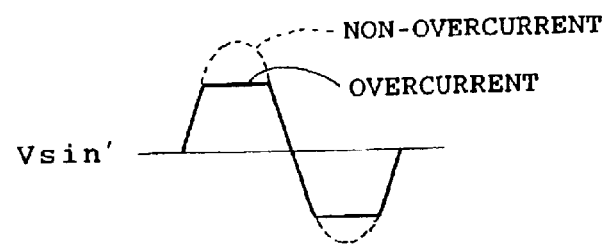

The PWM circuit 65 includes a peak limiter circuit 67 as shown in FIG. 5. The peak limiter circuit 67 comprises an operational amplifier 68 and an integration circuit 69. The output current signal Is delivered by the output current detecting circuit 64 is supplied to the operational amplifier 68. A peak current reference signal Ik is also supplied to the operational amplifier 68. When the output current signal Is corresponds to an overcurrent, the operational amplifier 68 is turned on with respect to a portion where the peak current reference signal Ik is exceeded. The aforesaid peak current reference signal Ik includes signal levels of +Ik and −Ik due to hysteresis as shown in FIG. 6A. Since the integration circuit 69 applies feedback to the operational amplifier 68, a peak portion of the PWM control signal Vsin' is cut off substantially into a flat portion as shown in FIG. 6C. Without the integration circuit 69, the PWM control signal Vsin' delivered by the peak limiter circuit 69 would instantaneously rise up and fall down such that the circuit would oscillate. In the embodiment, however, such a problem can be solved since the PWM control signal Vsin' takes a sinusoidal waveform when no overcurrent occurs, as shown by broken line in FIG. 6C.

Figure 7A:
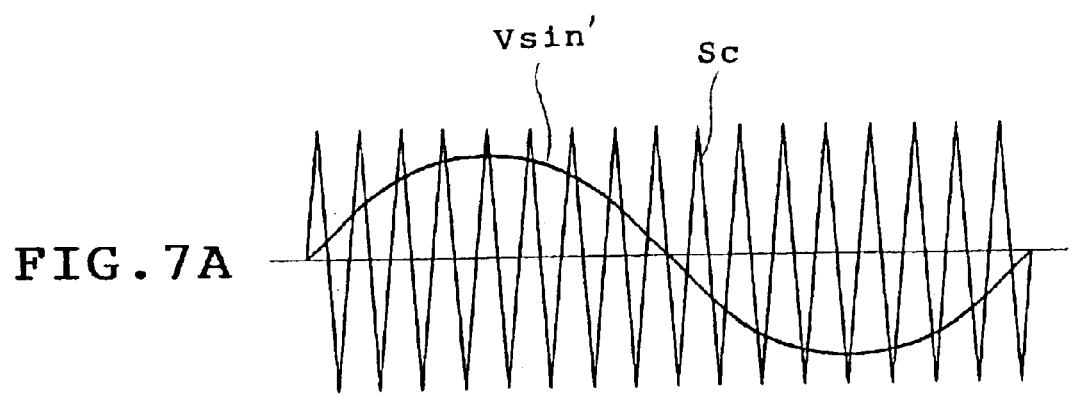
FIGS. 7A to 7C shows waveforms related to the PWM control.
Figure 7B:
Figure 7C:
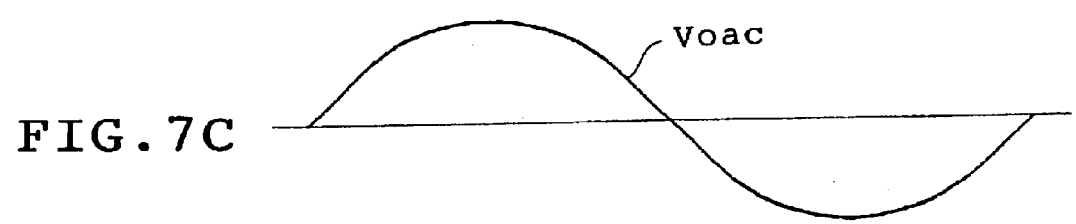

The PWM circuit 65 includes a comparator 70 comparing the aforesaid PWM control signal Vsin' with a carrier wave frequency signal Sc such as a triangular wave of 16 kHz, for example, as shown in FIG. 7A. The carrier wave frequency signal Sc is shown as having an excessively low frequency for the purpose of illustration in the drawing. Consequently, the PWM circuit 65 generates drive signals G1 to G4 so that a triangular wave high-frequency voltage V0 (100 V, 50 or 60 Hz) as shown in FIG. 7B is obtained. The filter circuit 38 eliminates high frequency components from the voltage V0 such that AC output V0ac of 100 V, 50 or 60 Hz is produced as shown in FIG. 7C. The PWM control signal Vsin' as shown in FIG. 7A denotes the condition where no overcurrent has occurred.

The microcomputer 61 serves as a power detector, a phase angle detector, a phase detector and a controller. Upon start of operation, the microcomputer 61 controls an output frequency according to the flowchart of FIG. 8. More specifically, at step Q1, the microcomputer 61 detects an initial zero cross in one cycle of the sine-wave reference voltage Vsin (see timing t0 in FIG. 4). Since an effective zero cross of the sine-wave reference signal Vsin corresponds with an effective zero cross of the output voltage V0, timing t0 of the initial zero cross in one cycle of the reference signal Vsin is detected. At step Q2, the microcomputer 61 determines which an instantaneous value Is(1) of the current is, positive or negative, namely, whether the current leads or lags behind the voltage, thereby detecting whether a phase angle θ is in the leading or lag phase.

Thereafter, the instantaneous value Is(n) where n changes from 1 to 6 is detected from the output current signal Is six times in a half cycle at equal time intervals at step Q3. An effective instantaneous power P(n) is calculated at step Q4. More specifically, the microcomputer 61 obtains products of the instantaneous values Is(n) at times (1) to (6) in FIG. 4 and the sine-wave reference signal Vsin(n) which is previously found, storing data of the obtained values. The microcomputer 61 further obtains a square of the instantaneous value I(n) at step Q5, storing data of the obtained value (step Q5). When steps Q3 to Q5 have been repeated six times (YES at step Q6), the microcomputer 61 advances to step Q7 to calculate an effective power P, which is obtained by the equation:

$$P = P(1) + P(2) + \ldots + P \qquad (6).$$

The microcomputer 61 advances to step Q8 to calculate an effective current value I, which is obtained by the equation:

$$I = ((Is(1)^2 + (Is(2)^2 + \ldots + (Is(6)^2)/6)^{1/2}.$$

At step Q9, the microcomputer 61 calculates a phase angle θ. The relationship between an apparent power (I×E) and the effective power P is shown by the equation:

$$P = (I \times E) \cos \theta.$$

Accordingly, the phase angle θ is obtained from cos θ since:

$$\cos \theta = P/(I \times E).$$

When the instantaneous value Is(n) is positive at step Q2, the microcomputer 61 determines that the phase angle θ is in the leading phase. On the other hand, when the instantaneous value Is(n) is negative at step Q2, the microcomputer 61 determines that the phase angle θ is in the lag phase.

Figure 9:
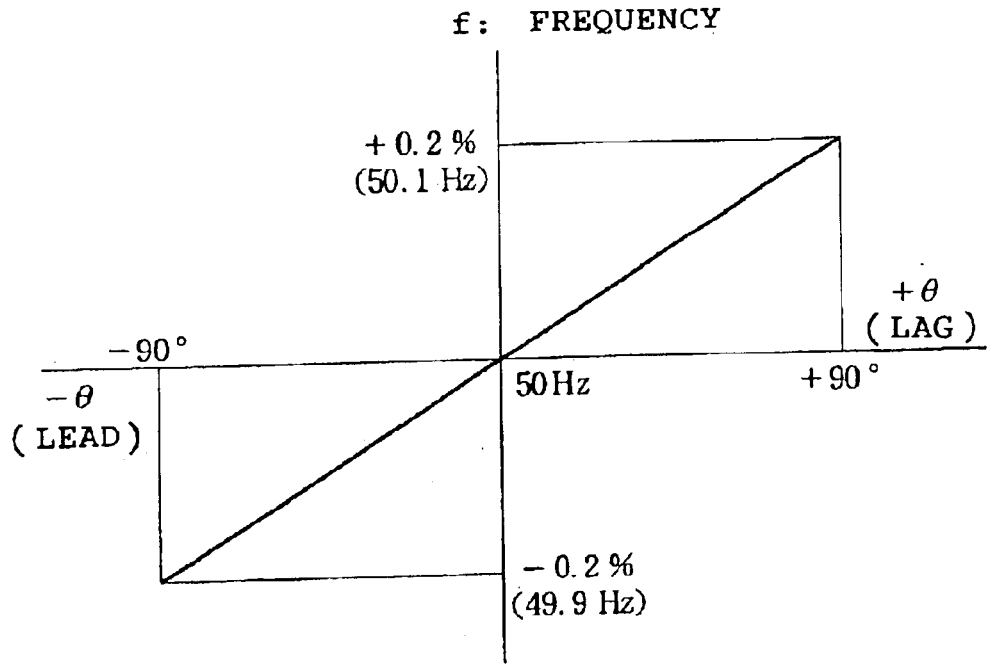
FIG. 9 shows frequency setting data.
Figure 10:
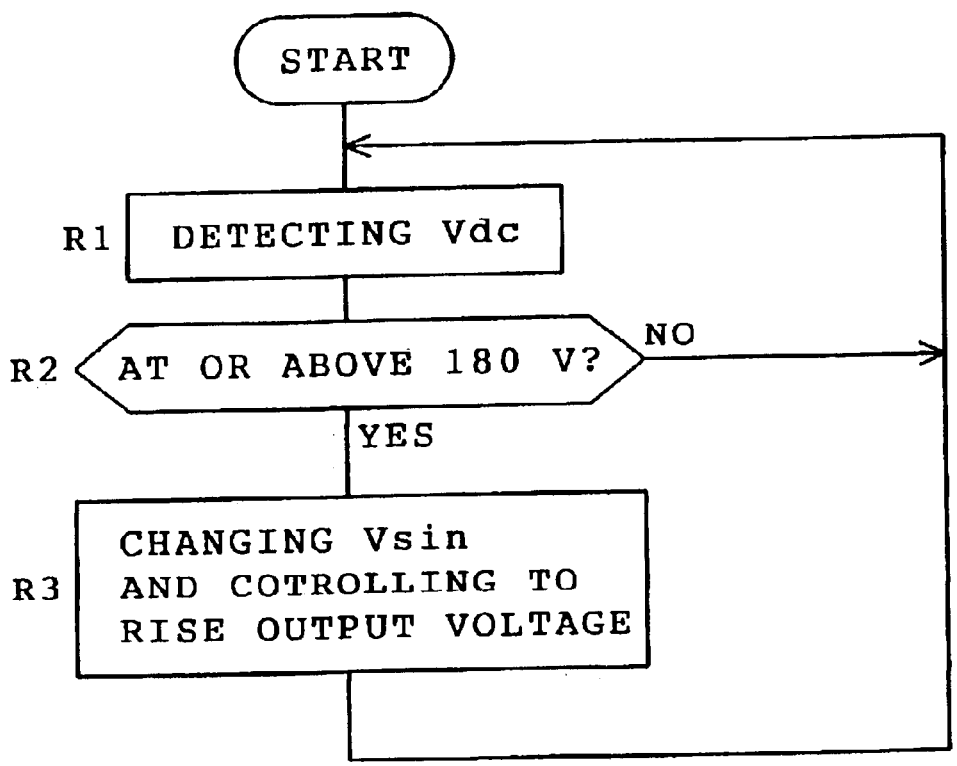
FIG. 10 is a flowchart showing another control manner by the microcomputer.

At step Q10, an output frequency is set on the basis of the phase angle θ and the leading or lag phase. This setting is executed on the basis of a data table as shown in FIG. 9.

More specifically, when the phase angle is in the leading phase, the output frequency is set so as to become small according to the phase angle θ. The output frequency is set so as to become large according to the phase angle θ when the phase angle is in the. lag phase. For example, the output frequency is 50.0 Hz when the phase angle θ is 0°. The output frequency is 50.1 Hz when the phase angle θ is 90°. The output frequency is linearly set between these values.

The microcomputer 61 has a function of detecting the DC voltage Vdc to adjust the output voltage irrespective of an on-off control of the thyristors 39 to 41. More specifically, as shown in steps R1 to R3 of FIG. 10, when the DC voltage Vdc is at or above 180 V, the output voltage is controlled to be increased. That is, the amplitude of the sine wave reference signal Vsin is increased so that the output voltage is increased. For example, when the DC voltage Vdc rises 1 V from 180 V, the output frequency is increased 0.01 Hz.

Figure 11:
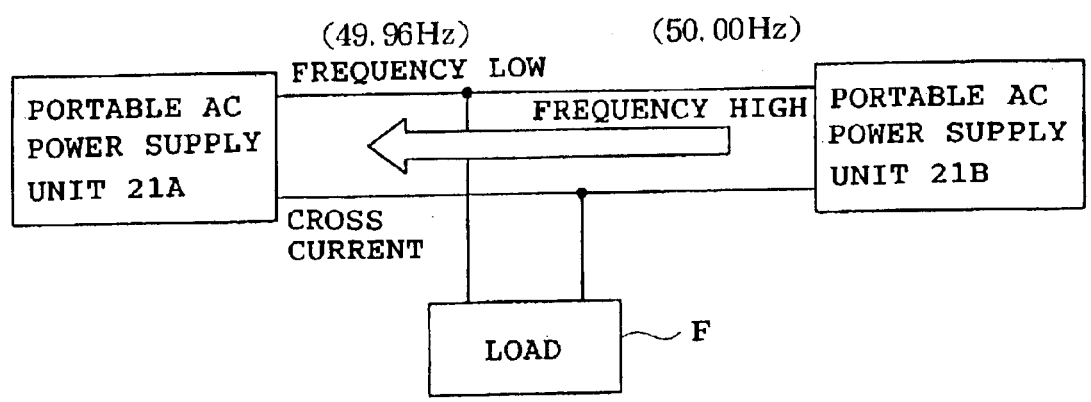
FIG. 11 shows a parallel operation of two portable AC power supply units with cross current due to output frequency occurring.

Parallel connection of the portable AC power supply units 21 will now be described. Referring to FIG. 11, two portable AC power supply units 21A and 21B are shown. Assume now that the output frequency of the unit 21B has instantaneously reduced to 49.96 Hz for some reason (load variation, for example). In this case, a cross current flows from the unit 21A to the unit 21B. In the unit 21B, the current leads the voltage and the phase angle is in the leading phase, whereas the current lags behind the voltage in the unit 21A such that the phase angle is in the lag phase. In the embodiment, the output frequency is increased when the phase angle is in the lag phase, and the output frequency is reduced when the phase angle is in the leading phase. Accordingly, the output frequency is increased in the unit 21A, whereas the output frequency is reduced in the unit 21B. Consequently, an amount of cross current flowing into the unit 21A is reduced such that the cross current is resolved between the units 21A and 21B. In particular, since the output frequency is increased or reduced according to the phase angle θ, the output frequency can be controlled promptly so as to take an optimum value.

In the foregoing embodiment, the effective power P contains the element of phase angle θ between the output voltage and the output current. The effective power P is detected, and the phase angle θ is calculated on the basis of the detected effective power P. Accordingly, an accurate phase angle θ can be detected even when the output current or the signal Is detected by the output current detecting circuit 64 has waveform distortion. Consequently, the accuracy in the detection of the phase angle θ can be improved. Thus, in the frequency control of the output voltage, an appropriate frequency control can be performed on the basis of a phase angle with higher detection accuracy, and the output currents are normally balanced between the power supply units in the case of the parallel operation.

Particularly, the effective power is detected in the half cycle of the sine wave reference signal Vsin. Accordingly, the detection of the effective power can be executed in a short period of time and the subsequent frequency control can be carried out quickly. However, the effective power may be detected in one cycle of the sine wave reference signal Vsin, instead.

Figure 12:
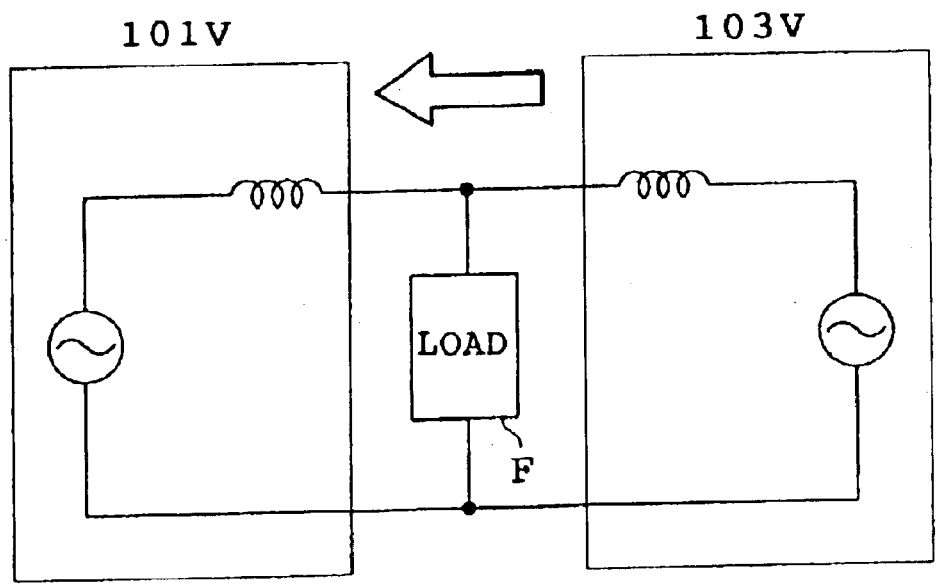
FIG. 12 shows a parallel operation of two portable AC power supply units with cross current due to output voltage occurring.

FIG. 12 illustrates a case where the output voltage of the unit 21B is higher than the output voltage of the unit 21A although the output frequencies of both units 21A and 21B are the same (50 or 60 Hz). In this case, a cross current flows from the 21B to the unit 21A. The output voltage adjusting function of the unit 21A detects the DC voltage Vdc which is at or above 180 V, thereby increasing the output voltage. As a result, the cross current can be prevented from flowing into the unit 21A.

Figure 13:
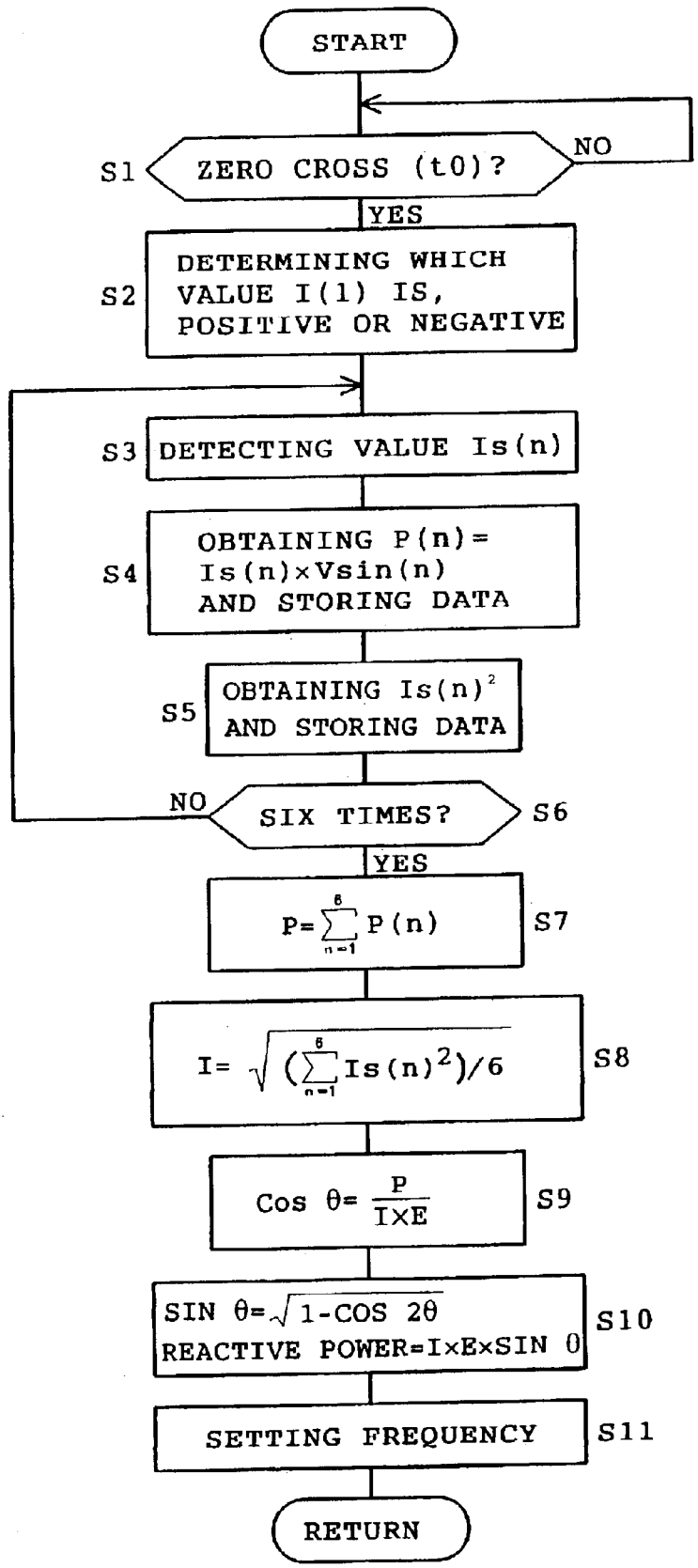
FIG. 13 is a flowchart showing a control manner in a second embodiment in accordance with the invention.
Figure 14:
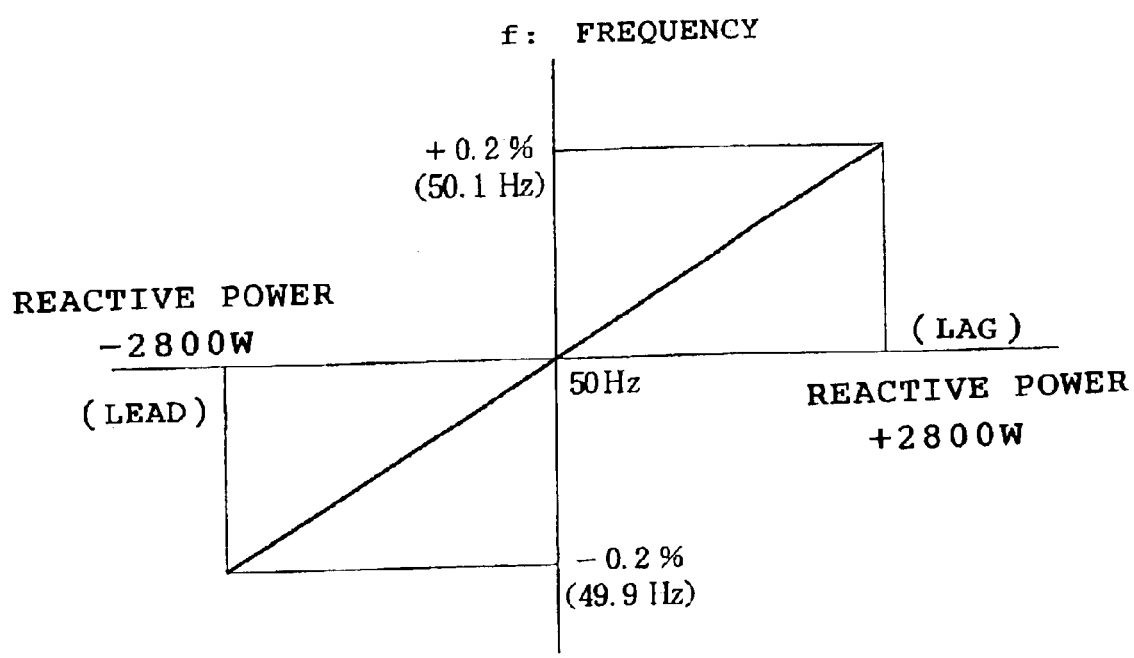
FIG. 14 is a view similar to FIG. 9.

FIGS. 13 and 14 show a second embodiment of the invention. The second embodiment differs from the first embodiment in that a wattless power is calculated from the effective power so that the output frequency is set according to the leading or lag phase of the phase angle in the wattless power. Steps S1 to S8 in the flowchart of FIG. 13 are identical with the steps Q1 to Q8 in FIG. 8 respectively. The value of cos θ is obtained at step S9. At step S10, the value of sin θ is obtained from cos θ and the wattless power is calculated (wattless power calculator). The leading or lag phase of the phase angle is determined at step S2 (phase detector). The phase angle is in the leading phase when the instantaneous value I(1) of the current is positive. The phase angle is in the lag phase when the instantaneous value is negative. At step S11, the frequency is set on the basis of the magnitude of the wattless power and the phase with reference to the data table as shown in FIG. 14. For example, when the wattless power in the leading phase is at −2800 W (corresponding to phase angle θ of −90°), the frequency is set at 49.9 Hz. Consequently, the same effect can be achieved from the second embodiment as from the first embodiment.

Figure 15A:
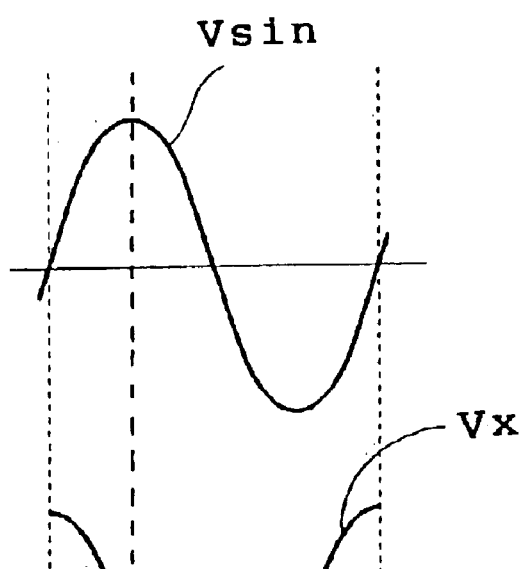
FIGS. 15A to 15C are waveform charts showing a third embodiment in accordance with the invention.
Figure 15B:
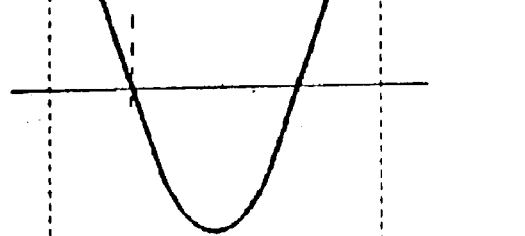
Figure 15C:
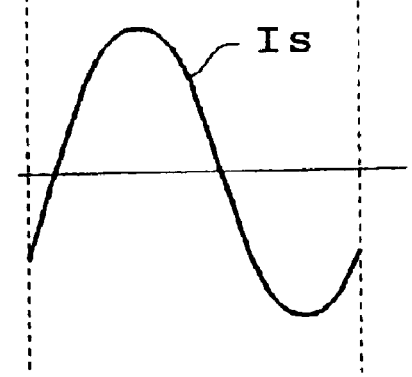

FIGS. 15A to 15C illustrate a third embodiment of the invention. As another manner of detecting the wattless power, the microcomputer 61 sets a signal Vx having a waveform leading the sine wave reference signal Vsin by 90°. The product of the signal Vx and the output current signal Is is obtained six times in a half cycle. The six products are added together, whereby the wattless power is detected. Thus, the wattless power can directly be obtained.

FIGS. 16A to 16D illustrate a fourth embodiment of the invention. The portable AC power supply units 21 of the first and second embodiments can cope with a case where a relatively small cross current flows into one of the units in parallel operation. When the cross current is small, the phase angle is not more than 90° and the effective power is positive though the phase angle is in the leading or lag phase, as shown in FIG. 16A. However, when the cross current is large, switching elements of the inverter circuit of the unit into which the cross current flow may be damaged. Accordingly, the cross current needs to be resolved or eliminated earlier. In this case, the current signal Is is 90° or more out of phase with the sine wave reference signal Vsin (180° out of phase) and the effective power is negative.

In view of the above-described problem, an output voltage controller is provided for increasing the output voltage when the detected effective power is negative. Consequently, since a large cross current is prevented from flowing into the power supply unit without detection of the phase angle, phase lead or lag, the switching elements of the inverter circuit or the like can effectively be prevented from being damaged. In this case, an auxiliary controller may be provided for increasing the frequency of the output voltage when the detected effective power is negative. As a result, since the increase in the frequency reduces an amount of the cross current flowing into the power supply unit, the same effect can be achieved from the fourth embodiment as from the first embodiment.

FIGS. 17 to 21 illustrate a fifth embodiment of the invention. In the fifth embodiment, the CPU (not shown) of the microcomputer 61 in the first embodiment further severs as a corrected value calculator, a phase angle detector and a sine wave reference data corrector, so that the sine wave reference signal is corrected to prevent variations in the output voltage.

Figure 8:
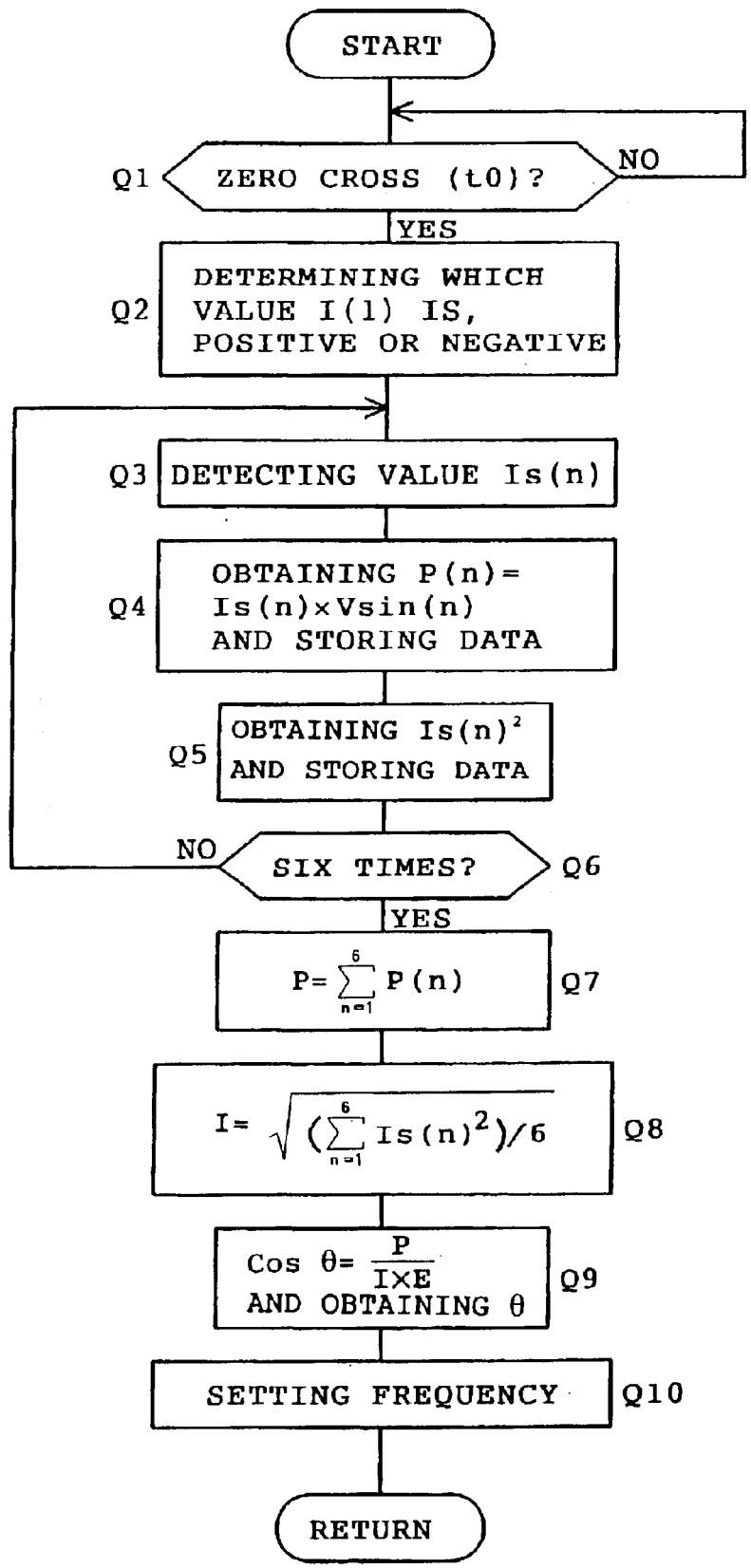
FIG. 8 is a flowchart showing a control manner by the microcomputer.
Figure 20:
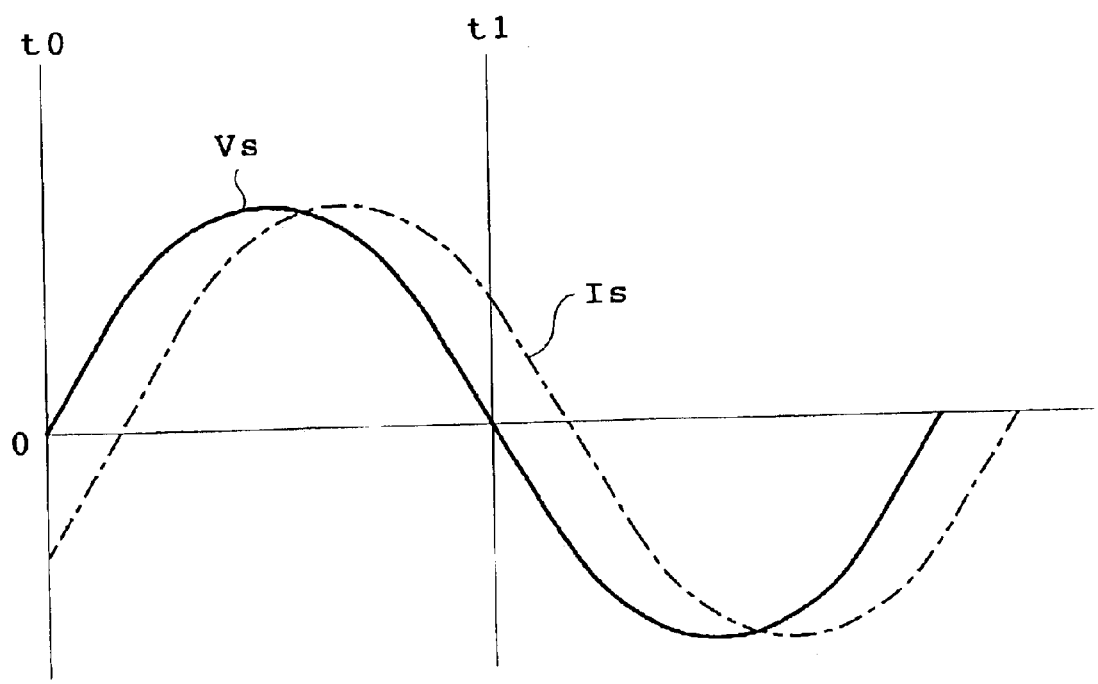
FIG. 20 is a waveform chart showing an output voltage signal and an output current signal.

Correction of the sine wave reference signal will now be described with reference to FIG. 17. The correction is executed in parallel with the control as shown in FIG. 8. Upon start of the operation, the microcomputer 61 delivers the sine wave reference signal Vsin as will be described later. The PWM circuit 65 delivers a PWM signal on the basis of the sine wave reference signal Vsin. The inverter circuit 37 controls the switching elements 45 to 48 on the basis of the PWM signal thereby to deliver a high-frequency voltage $V_O$ as shown in FIG. 7. At this time, the output voltage detecting circuit 63 detects output voltage, and the microcomputer 61 determines whether the output current signal Is is in the leading or lag phase at zero cross $t_0$ and zero cross $t_1$ of the output voltage Vs, as shown in FIG. 20. More specifically, when detecting the zero cross $t_0$ (from the negative to the positive) of the output voltage signal Vs at step S1 in FIG. 21 and detecting a positive digital value Id of the output current signal Is at step S2, the microcomputer 61 determines that the output current signal is in the leading phase. On the other hand, when the digital value Id of the output current signal Is is negative, the microcomputer 61 determines that the output current signal Is is in the lag phase. When detecting the zero cross $t_1$ (from the positive to the negative) of the output voltage signal Vs at step S3 and detecting a negative digital value Id of the output current signal Is at step S4, the microcomputer 61 determines that the output current signal Is is in the leading phase. When the digital value Id is positive, the microcomputer 61 determines that the output current signal Is is in the lag phase. FIG. 20 shows a case where the detected current Is lags behind the detected voltage Vs.

Figure 17:
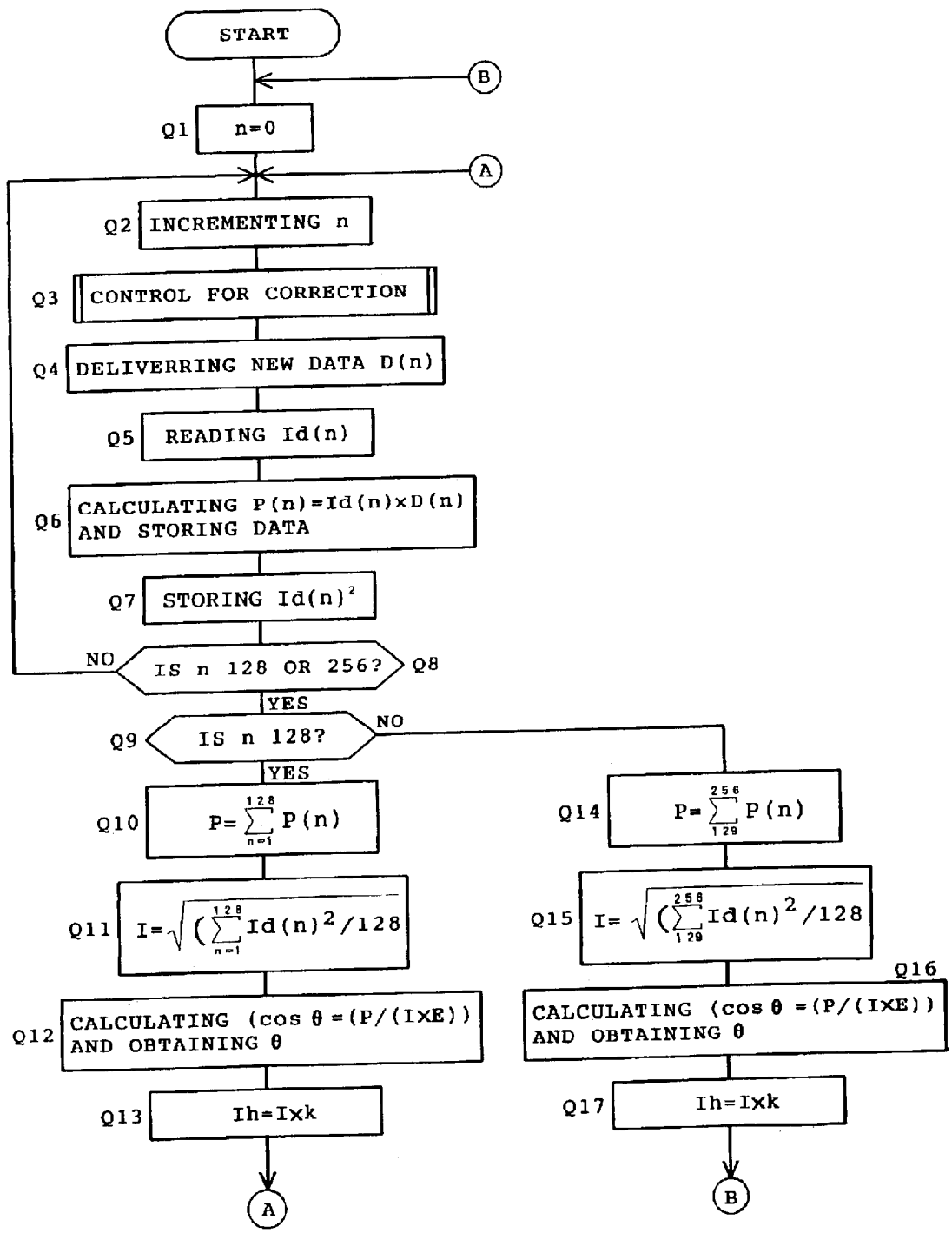
FIG. 17 is a flowchart showing an overall control manner for correction in a fifth embodiment in accordance with the invention.
Figure 18:
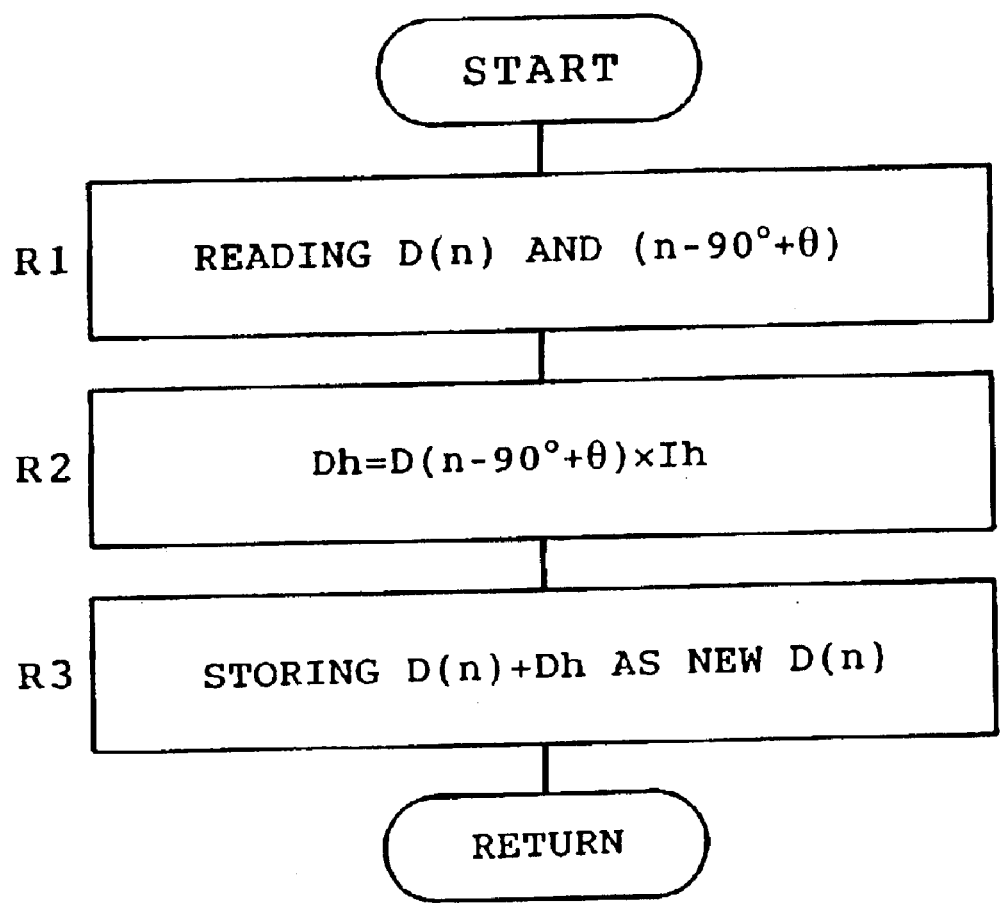
FIG. 18 is a flowchart showing a control manner for correction.

At this time, the microcomputer 61 corrects the sine wave reference data D(n) according to the flowcharts of FIGS. 17 and 18 thereby to correct the sine wave reference signal Vsin. More specifically, the microcomputer 61 sets the parameter n of the sine wave reference data D(n) at 0 at step Q1 in FIG. 17. The microcomputer 61 then increments the parameter n at step Q2 and carries out the correcting control at step Q3. The correcting control is shown as a subroutine in FIG. 18. At step R1, the microcomputer 61 reads from ROM 61b the sine wave reference data D(n) corresponding to the current output timing. In this case, data D(1) and sine wave reference data leading the data D(1) by 90° and displaced by a phase angle θ. For example, since 256 parameters n are present in 360° of electrical angle (one cycle at 50 or 60 Hz), n is increased to "2," "3," "4" and so on for every increase of (360/256)° when n is "1" at the phase angle of 0°. When converted to time, the aforesaid (360/256)° becomes (⅟50 sec.)/256 at 50 Hz and (⅟60 sec.)/256 at 60 Hz.

Figure 19:
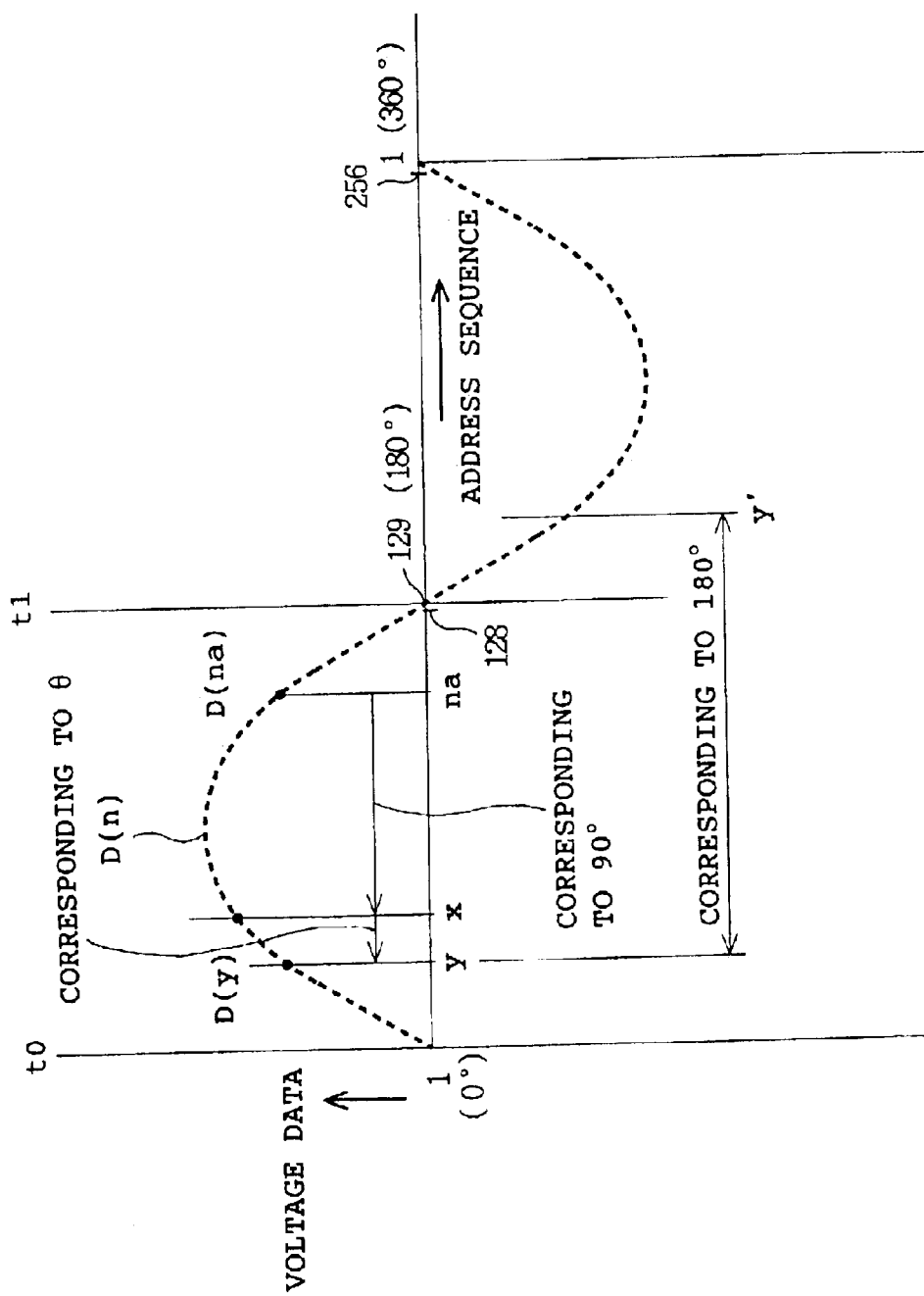
FIG. 19 is a flowchart showing a control manner for correction using sine wave reference data.

For example, when the phase angle θ is 30° and in the leading phase, the parameter n (n=na) becomes sequence "x" which leads na by 90° as shown in FIG. 19. Sequence "y" leads sequence "x" by the phase angle θ. When sequence "y" is out of the range between 1 and 256, the data displaced from sequence "y" by 180° is inverted. See "y'" in FIG. 19. The sine wave reference data D(n+90°+θ) is the sine wave reference data D(y) in this sequence "y". At step R2, the microcomputer 61 then multiplies the data D(n+90°+θ) by a correction value Ih to originate correction data Dh. The correction value Ih will be described later. The microcomputer 61 then advances to step R3 where the correction data Dh is added to the current sine wave reference data D(n) to obtain new sine wave reference data D(n). Data stored on RAM 61c is renewed such that the new data D(n) is stored on RAM 61c. The microcomputer 61 further advances to step Q4 in FIG. 17 to deliver the new data D(n) to the D/A converter 61d. An output cycle is set to be at time intervals of 256 for ⅟50 sec. in the frequency of 50 Hz and at time intervals of 256 for ⅟60 sec. in the frequency of 60 Hz.

At step Q7, the microcomputer 61 squares the detected current value Id(n), storing data of the squared value. The microcomputer 61 then advances to step Q8 to determine whether n is 128 or 256. Since n is less than 128 at the beginning, the microcomputer 61 determines in the negative (NO) at step Q8, returning to step Q2. Thus, when steps Q2 to Q7 are repeatedly carried out at 128 times or a half cycle is completed, the microcomputer 61 determines in the affirmative at step Q8, advancing to step Q9 where the microcomputer 61 determines whether n is 128. When n is 128, the microcomputer 61 advances to step Q10 to calculate effective power P when n is 1 to 128. In this case, effective power P is obtained by the equation:

$$P=P(1)+P(2)+ \ldots +P(128).$$

The microcomputer 61 calculates an effective current value I at step Q11. The effective current value I is obtained by the equation:

$$I=((Id(1)^2+ \ldots Id(128)^2)/128)^{1/2}.$$

Then, the microcomputer 61 obtains the phase angle θ at step Q12. More specifically, the relationship between an apparent power (I×E) and the effective power P is shown by the equation:

$$P=(I \times E)\cos \theta.$$

Accordingly, the phase angle θ is obtained from cos θ since:

$$\cos \theta = P/(I \times E).$$

Figure 21:
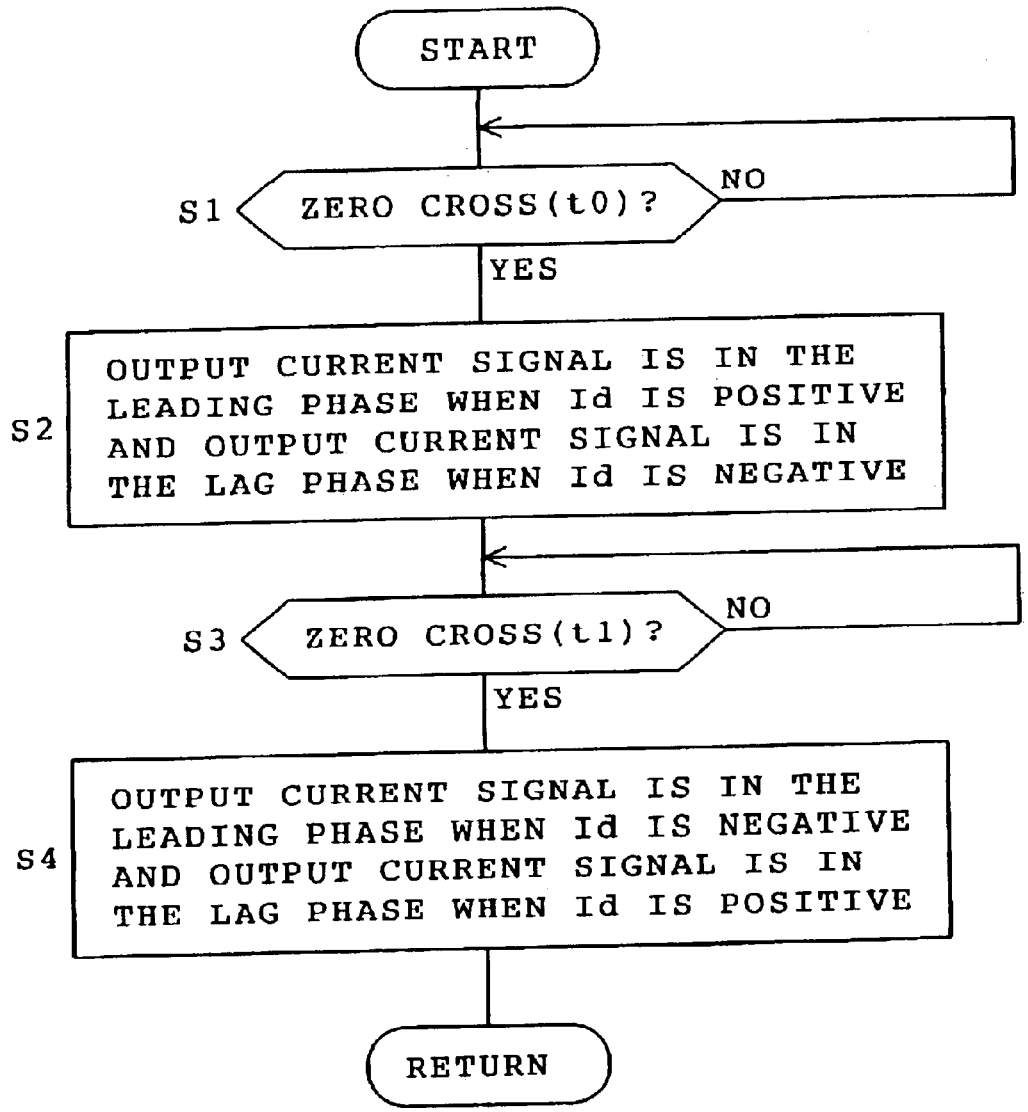
FIG. 21 is a flowchart showing determination of a leading or lagging state of the output current.
Figure 22:
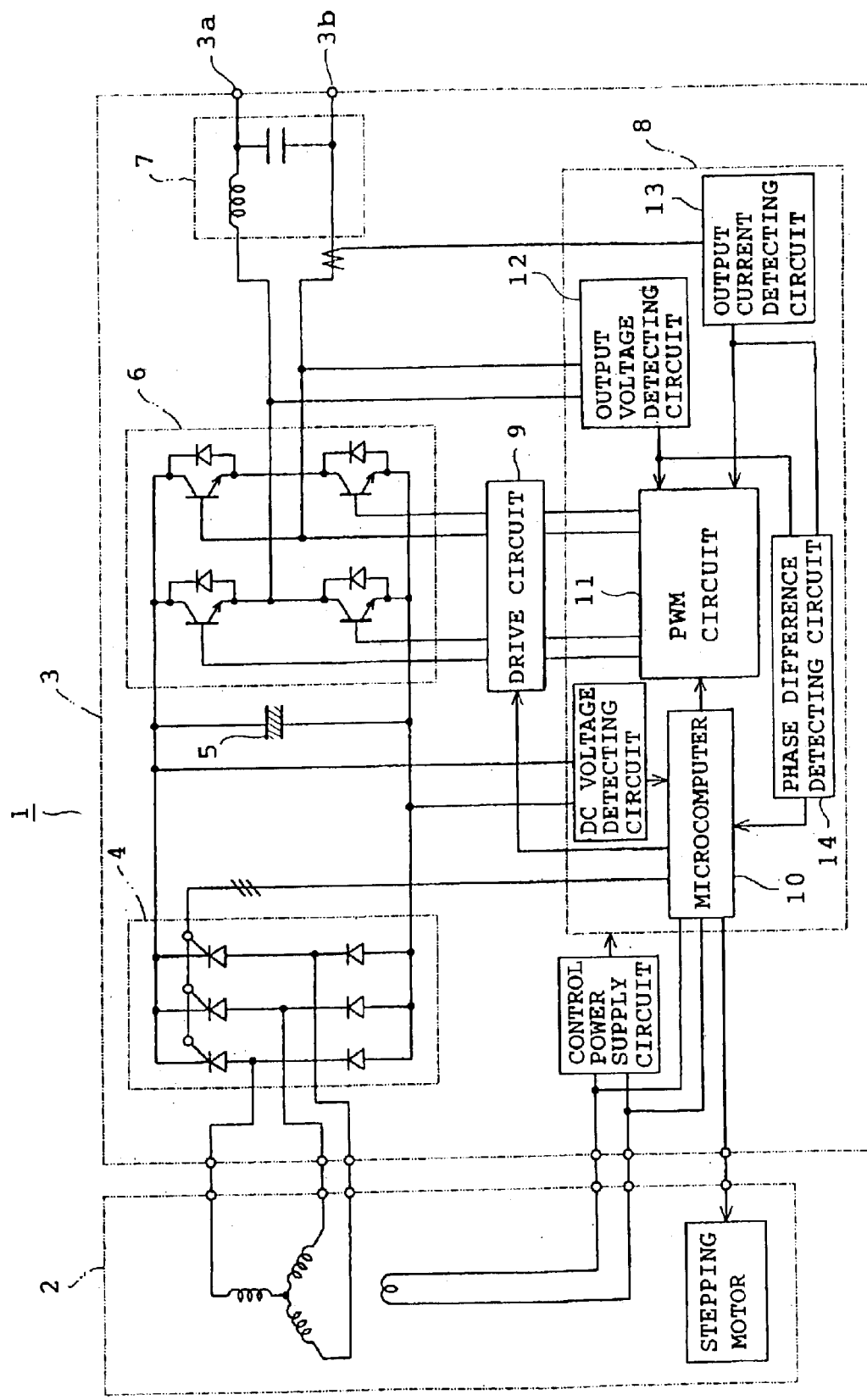
FIG. 22 is a view similar to FIG. 1, showing a conventional power supply unit.

In an initial half cycle, the result of detection at step S2 in FIG. 21 is the latest. The phase angle θ is in the leading phase when the latest result of detection is positive. On the other hand, the phase angle θ is in the lagging phase when the result of detection is negative.

A correction value Ih is calculated at step Q13. The correction value is obtained by multiplying a factor k by an effective value I of current. The factor k depends upon the reactor 55 of the filter circuit 38 etc. Thereafter, the microcomputer 61 returns to step Q2 to carry out the same control in a latter half cycle (where n=129 to 256) as described above for the first half cycle. The phase angle θ and the correction value Ih obtained in the first half cycle (where n=1 to 128) are used in the latter half cycle. When the control at steps Q2 through Q7 is executed at 256 times, the microcomputer 61 determines in the affirmative at step Q8 and in the negative at step Q9, executing steps Q14 to Q17 which are substantially identical with respective steps Q10 to Q13 with the exception of n=129 to 256. The microcomputer 61 then returns to step Q1. Thus, the sine wave reference data D(n) for one cycle is supplied to the D/A converter 61d. The D/A converter 61d delivers the sine wave reference signal Vsin on the basis of the supplied data D(n). The delivered sine wave reference signal Vsin is supplied to the PWM circuit 65.

According to the above-described embodiment, the microcomputer 61 reads out the sine wave reference data D(n) corresponding to the current output timing. The microcomputer 61 further reads out the sine wave reference data D(y) leading the read data D(n) by 90° and shifted by the phase angle θ relative to the read data D(n). The microcomputer 61 multiplies the correction value Ih by the read sine wave reference data D(y) to obtain correction data Dh. The microcomputer 61 further adds the correction data Dh to the sine wave reference data D(n) corresponding to the current output timing to obtain new sine wave reference data D(n). Thus, data correction is performed in consideration of the lag of 90° due to the filter circuit 38, the phase angle θ of the output current due to the load and an L component peculiar to the filter circuit 38. The corrected sine wave reference data D(n) is delivered to the D/A converter 61d, which delivers the sine wave reference signal corrected on the basis of the corrected sine wave reference data D(n). Consequently, the variations in the output voltage can be reduced. Further, the above-described arrangement requires no analog circuit such as a differential amplifier including resistors and capacitors or a power factor correcting circuit including resistors, capacitors and an operational amplifier. Consequently, the circuit arrangement can be simplified and accordingly, the cost can be reduced.

The current value Id is detected in the half cycle of the output voltage signal Vs corresponding to the half cycle of the output voltage, and the effective current value I is calculated. Consequently, the output current value can be detected in a short period of time, and the detected effective value I contains a reduced amount of error detection. On the other hand, the current value Id may be detected in one cycle of the output voltage signal Vs, instead. Further, the effective power P is calculated on the basis of the sine wave reference data D(n) in the half cycle and the effective value I, and the phase angle θ is calculated on the basis of the effective power P in the half cycle. Consequently, the phase angle can be detected in a short period of time. On the other hand, the effective power P may be calculated on the basis of the data D(n) detected in one cycle.

Further, each of calculation of the correction value Ih and detection of the phase angle θ may be carried out in a half cycle of the output voltage signal Vs. The obtained correction value Ih and phase angle θ are used for correction of the data D(n) and output of the signal Vsin in the next half cycle. Consequently, the control for correction of the sine wave reference signal Vsin can be performed quickly such that a quick feedback control can be realized.

The sine wave reference data D(n) corresponding to 256 phase angles in one cycle of the AC voltage to be delivered are stored in the foregoing embodiments. The number of data should not be limited to 256. Further, the data in a half cycle of the AC voltage may be stored, instead. In this case, since the polarity in a first half cycle is inverted in the next half cycle, the data used in the first half cycle needs to be inverted in the next half cycle.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. An inverter parallel operation system, comprising:
   a DC power supply circuit;
   a filter circuit:
   a plurality of AC output terminals;
   a PWM signal generator generating a PWM signal;
   an inverter circuit having a plurality of switching elements driven by the PWM signal; and
   a plurality of AC power supply units that switch an output of the DC power supply circuit, based on the switching elements, to deliver a high-frequency voltage via the filter circuit to the respective AC output terminals, the AC power supply units connected and configured to supply AC power via the respective output terminals to a common load, each AC power supply unit comprising:
   a power detector configured to detect an effective power at an AC output terminal side and an apparent power corresponding to the effective power;
   a phase angle calculator that calculates a phase angle of current relative to voltage from the detected effective power and apparent power;
   a phase angle detector that detects a leading or lagging state of the phase angle calculated by the phase angle calculator; and
   a frequency controller that controls the switching elements to (a) decrease a frequency of the output voltage of the inverter circuit when the phase angle detector detects a leading phase angle, and (b) increase the frequency of the output voltage of the inverter circuit when the phase angle detector detects a lagging phase angle.

2. An inverter parallel operation system according to claim 1, wherein the decrease or increase in the frequency of the output voltage has values based on degrees of the leading and lagging angles, respectively.

3. An inverter parallel operation system according to claim 1, further comprising a wattless power calculator that calculates a wattless power based on the effective power, and wherein the frequency controller controls the switching elements so that the decrease or increase in the frequency of the output voltage has values based on a magnitude of the wattless power.

4. An inverter parallel operation system according to claim 1, wherein the power detector detects the effective power and the apparent power at least in a half cycle of a sine wave reference signal.

5. An inverter parallel operation system according to claim 1, further comprising an output voltage controller that increases the output voltage of the inverter circuit when the detected effective power is negative.

6. An inverter parallel operation system according to claim 1, further comprising an auxiliary controller that increases an output frequency of the inverter circuit when the detected effective power is negative.

7. An inverter parallel operation system according to claim 1, wherein the PWM signal generator includes:
   a storage device configured to store a number of sine wave reference data corresponding to a number of phase angles at least in a half cycle of an alternating current respectively;
   a sine wave reference signal generator to which the sine wave reference data are provided to generate a sine wave reference signal with a predetermined frequency;
   a PWM signal obtaining circuit that obtains the PWM signal based on the sine wave reference signal;
   an output current detector configured to detect a value of current produced by the inverter circuit;
   a corrected value calculator that calculates a corrected value on the basis of the current value detected by the output current detector; and
   a sine wave reference data corrector that reads from the storage device the first sine wave reference data corresponding to a current output timing and the second sine wave reference data leading the first sine wave reference data by 90 degrees and displaced from the first sine wave reference data by a phase angle,
   wherein the sine wave reference data corrector multiplies the read second sine wave reference data by the corrected value to produce corrected data, adds the corrected data to the first sine wave reference data corresponding to the current output timing to produce new sine wave reference data, causes the new sine wave reference data to be stored on the storage device so that the data thereon is renewed, and delivers the new sine wave reference data to the sine wave reference signal generator.

8. An inverter parallel operation system according to claim 7, wherein the output current detector detects the current value at least in a half cycle of the output voltage to calculate the effective value of the detected current.

9. An inverter parallel operation system according to claim 7, wherein the phase angle calculator calculates the effective power from sine wave reference data at least in a half cycle and the value detected by the output current detector to calculate the phase angle from the calculated effective power.

10. An inverter parallel operation system according to claim 7, wherein the corrected value calculator calculates the corrected value at least in a half cycle of the output voltage, the phase angle calculator calculates the phase angle at least in the half cycle of the output voltage, and the sine wave reference data corrector carries out control in a subsequent half cycle of the output voltage using the calculated corrected value and phase angle.

11. An inverter parallel operation system comprising:
a DC power supply circuit;
a filter circuit;
a plurality of AC output terminals;
a PWM signal generator generating a PWM signal;
an inverter circuit having a plurality of switching elements driven by the PWM signal;
a plurality of AC power supply units that switch an output of the DC power supply circuit, based on the switching elements, to deliver a high-frequency voltage via the filter circuit to the respective AC output terminals, the AC power supply units connected and configured to supply AC power via the respective output terminals to a common load, each AC power supply unit comprising:
a power detector configured to detect a wattless power at an AC output terminal side and an apparent power corresponding to the wattless power;
a phase angle calculator that calculates a phase angle of current relative to voltage from the detected wattless power and apparent power;
a phase angle detector configured to detect a leading or lagging state of the phase angle calculated by the phase angle calculator; and
a frequency controller that controls the switching elements to (a) decrease a frequency of the output voltage of the inverter circuit when the phase angle detector detects a leading phase angle, and (b) increase the frequency of the output voltage of the inverter circuit when the phase angle detector detects a lagging phase angle.

12. An inverter parallel operation system according to claim 11, further comprising a sine wave reference signal generator that generates a sine wave reference signal and an output current detector that detects a value of current produced by the inverter circuit, wherein the PWM signal is synthesized on the basis of the sine wave reference signal generated by the sine wave reference signal generator, and the power detector detects the wattless power on the basis of a detected value of an output current from the inverter circuit and a signal leading the sine wave reference signal by an electrical angle of 90 degrees.

13. An inverter parallel operation system according to claim 12, wherein the frequency controller controls the switching elements so that amounts of decrease and increase in the frequency of the output voltage have values according to a magnitude of the wattles power.

14. An inverter parallel operation system according to claim 11, wherein the PWM signal generator includes:
a storage device storing a number of sine wave reference data corresponding to a number of phase angles at least in a half cycle of an alternating current respectively;
a sine wave reference signal generator to which the sine wave reference data are provided to generate a sine wave reference signal with a predetermined frequency;
a PWM signal obtaining circuit that obtains the PWM signal on the basis of the sine wave reference signal;
an output current detector configured to detect a value of current produced by the inverter circuit;
a corrected value calculator that calculates a corrected value on the basis of the current value detected by the output current detector; and
a sine wave reference data corrector that reads from the storage device the first sine wave reference data corresponding to a current output timing and the second sine wave reference data leading the first sine wave reference data by 90 degrees and displaced from the first sine wave reference data by a phase angle, that multiplies the read second sine wave reference data by the corrected value to produce corrected data, that adds the corrected data to the first sine wave reference data corresponding to the current output timing to produce new sine wave reference data, that causes the new sine wave reference data to be stored on the storage device so that the data thereon is renewed, and that delivers the new sine wave reference data to the sine wave reference signal generator.

15. An inverter parallel operation system according to claim 14, wherein the output current detector detects the current value at least in a half cycle of the output voltage to calculate the effective value of the detected current.

16. An inverter parallel operation system according to claim 14, wherein the corrected value calculator calculates the corrected value at least in a half cycle of the output voltage, the phase angle calculator calculates the phase angle at least in the half cycle of the output voltage, and the sine wave reference data corrector carries out control in a subsequent half cycle of the output voltage using the calculated corrected value and phase angle.

17. An inverter unit comprising:
a DC power supply circuit;
an AC output terminal;
a PWM signal generator that generates a PWM signal;
an inverter circuit having a plurality of switching elements driven by the PWM signal and switching an output of the DC power supply circuit by the switching elements to deliver a high-frequency voltage;
a filter circuit provided between the AC output terminal and the inverter circuit that converts the high-frequency voltage to a substantially sinusoidal AC voltage;
a power detector configured to detect an effective power at an AC output terminal side and an apparent power corresponding to the effective power;
a phase angle calculator that calculates a phase angle of current relative to voltage from the detected effective power and apparent power;

a phase angle detector configured to detect a leading or lagging state of the phase angle calculated by the phase angle calculator; and a frequency controller that controls the switching elements to (a) decrease a frequency of the output voltage of the inverter circuit when the phase angle detector detects a leading phase angle, and (b) increase the frequency of the output voltage of the inverter circuit when the phase angle detector detects a lagging phase angle, wherein the PWM signal generator includes:

a storage device storing a number of sine wave reference data corresponding to a number of phase angles at least in a half cycle of an alternating current respectively;

a sine wave reference signal generator to which the sine wave reference data are sequentially supplied to generate a sine wave reference signal with a predetermined frequency;

a PWM signal obtaining circuit obtaining the PWM signal on the basis of the sine wave reference signal an output current detector detecting a value of current produced by the inverter circuit;

a corrected value calculator calculating a corrected value on the basis of the current value detected by the output current detector; and a sine wave reference data corrector that reads from the storage device the first sine wave reference data corresponding to a current output timing and the second sine wave reference data leading the first sine wave reference data by 90 degrees and displaced from the first sine wave reference data by a phase angle, that multiplies the read second sine wave reference data by the corrected value to produce corrected data, that adds the corrected data to the first sine wave reference data corresponding to the current output timing to produce new sine wave reference data, that causes the new sine wave reference data to be stored on the storage device so that the data thereon is renewed, and that delivers the new sine wave reference data to the sine wave reference signal generator.

18. An inverter unit, comprising:

a DC power supply circuit;

an AC output terminal;

a PWM signal generator that generates a PWM signal;

an inverter circuit having a plurality of switching elements driven by the PWM signal and switching an output of the DC power supply circuit by the switching elements to deliver a high-frequency voltage;

a filter circuit provided between the AC output terminal and the inverter circuit for converting the high-frequency voltage to a substantially sinusoidal AC voltage;

a power detector configured to detect a wattless power at an AC output terminal side and an apparent power corresponding to the wattless power;

a phase angle calculator that calculates a phase angle of current relative to voltage from the detected wattless power and apparent power;

a phase angle detector configured to detect a leading or lagging state of the phase angle calculated by the phase angle calculator;

a frequency controller that controls the switching elements to (a) decrease a frequency of the output voltage of the inverter circuit when the phase angle detector detects a leading phase angle, and (b) increase the frequency of the output voltage of the inverter circuit when the phase angle detector detects a lagging phase angle; and a sine wave reference signal generator that generates a sine wave reference signal; and an output current detector configured to detect a value of current produced by the inverter circuit, wherein the PWM signal is synthesized based on the sine wave reference signal generated by the sine wave reference signal generator, and the power detector detects the wattless power based on a detected value of an output current from the inverter circuit and a signal leading the sine wave reference signal by an electrical angle of 90 degrees.

* * * * *